United States Patent
Momoki

(10) Patent No.: US 12,536,211 B2
(45) Date of Patent: Jan. 27, 2026

(54) INFORMATION PROCESSING APPARATUS THAT SEARCHES FOR A PLURALITY OF COMMENT-ON-FINDINGS CANDIDATES RELATED TO A SEARCH QUERY

(71) Applicant: FUJIFILM CORPORATION, Tokyo (JP)

(72) Inventor: Yohei Momoki, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/925,039

(22) Filed: Oct. 24, 2024

(65) Prior Publication Data

US 2025/0139141 A1 May 1, 2025

(30) Foreign Application Priority Data

Oct. 31, 2023 (JP) ................. 2023-187173

(51) Int. Cl.
G06F 16/00 (2019.01)
G06F 16/334 (2025.01)
G06F 16/532 (2019.01)
G06F 16/903 (2019.01)

(52) U.S. Cl.
CPC ........ *G06F 16/3344* (2019.01); *G06F 16/532* (2019.01); *G06F 16/90344* (2019.01)

(58) Field of Classification Search
CPC ................................. G06F 16/90344
See application file for complete search history.

(56) References Cited

U.S. PATENT DOCUMENTS

2005/0108216 A1* 5/2005 Schramm-Apple .... G16H 70/00
2013/0212475 A1 8/2013 Lee et al.

FOREIGN PATENT DOCUMENTS

JP 2013-541786 A 11/2013

* cited by examiner

*Primary Examiner* — Ajith Jacob
(74) *Attorney, Agent, or Firm* — SOLARIS Intellectual Property Group, PLLC

(57) ABSTRACT

An information processing apparatus including a processor, wherein the processor is configured to: search for a plurality of comment-on-findings candidates related to a search query from a comment-on-findings group including a plurality of comments on findings; and present, based on a predetermined importance for each combination of two pieces of element information associated with each of the plurality of comment-on-findings candidates, at least one piece of the element information.

19 Claims, 9 Drawing Sheets

| No. | COMMENT ON FINDINGS | DIAGNOSTIC INFORMATION | FINDING INFORMATION ||||||| ... |
| | | | TYPE | POSITION | MAJOR AXIS (mm) | MINOR AXIS (mm) | PROPERTIES ETC. 1 FACTUALITY | PROPERTIES ETC. 2 FACTUALITY | PROPERTIES ETC. 3 FACTUALITY | |
|---|---|---|---|---|---|---|---|---|---|---|
| 1 | 20 × 19 mm SIZED FAT DENSITY NODULE IS FOUND IN LEFT KIDNEY. IT IS CONSIDERED TO BE AML. | ANGIOMYOLIPOMA | NODULE | LEFT KIDNEY | 20 | 19 | FAT DENSITY / PRESENT | --- | --- | ... |
| 2 | 20 × 18 mm SIZED SOLID NODULAR OPACITY IS FOUND IN LEFT KIDNEY. SINCE CONTRAST EFFECT IS RELATIVELY WEAK AND CONTRAST INCREASES GRADUALLY, FIRST SUSPICION IS PAPILLARY RENAL CARCINOMA. | RENAL CANCER | NODULE | LEFT KIDNEY | 20 | 18 | SOLID / PRESENT | CONTRAST EFFECT / WEAK | GRADUAL INCREASE / PRESENT | ... |
| 3 | 20 mm SIZED NODULE SEEN IN LEFT KIDNEY IS LOW OPACITY IN LOWER PART AND EQUAL OPACITY IN UPPER PART COMPARED TO SURROUNDING KIDNEY, AND POSSIBILITY OF TUMOR MAY BE CONSIDERED. | TUMOR | NODULE | LEFT KIDNEY | 20 | --- | LOW OPACITY / PRESENT | EQUAL OPACITY / PRESENT | --- | ... |
| 4 | SLIGHTLY HIGH-OPACITY NODULE (21 × 20 mm) PROTRUDING OTWARD FROM LEFT KIDNEY IS FOUND, WHICH IS SUSPICION TO BE HEMORRHAGIC CYST. | CYST | NODULE | LEFT KIDNEY | 21 | 20 | PROTRUSION / PRESENT | HIGH OPACITY / SLIGHTLY STRONG | --- | ... |
| ⋮ | ⋮ | ⋮ | ⋮ | ⋮ | ⋮ | ⋮ | ⋮ | ⋮ | ⋮ | ⋮ |

FIG. 6

| No. | COMMENT ON FINDINGS | ELEMENT INFORMATION ||||||||||
|---|---|---|---|---|---|---|---|---|---|---|---|
| | | DIAGNOSTIC INFORMATION | TYPE | POSITION | MAJOR AXIS (mm) | MINOR AXIS (mm) | FINDING INFORMATION |||||
| | | | | | | | PROPERTIES ETC. 1 | FACTUALITY | PROPERTIES ETC. 1 | FACTUALITY | PROPERTIES ETC. 2 | FACTUALITY | PROPERTIES ETC. 3 | ... |
| 1 | 20 × 19 mm SIZED FAT DENSITY NODULE IS FOUND IN LEFT KIDNEY. IT IS CONSIDERED TO BE AML. | ANGIOMYOLIPOMA | NODULE | LEFT KIDNEY | 20 | 19 | FAT DENSITY | — | — | — | — | — | ... |
| 2 | 20 × 18 mm SIZED SOLID NODULAR OPACITY IS FOUND IN LEFT KIDNEY. SINCE CONTRAST EFFECT IS RELATIVELY WEAK AND CONTRAST INCREASES GRADUALLY, FIRST SUSPICION IS PAPILLARY RENAL CARCINOMA. | RENAL CANCER | NODULE | LEFT KIDNEY | 20 | 18 | SOLID | PRESENT | CONTRAST EFFECT | WEAK | GRADUAL INCREASE | PRESENT | ... |
| 3 | 20 mm SIZED NODULE SEEN IN LEFT KIDNEY IS LOW OPACITY IN LOWER PART AND EQUAL OPACITY IN UPPER PART COMPARED TO SURROUNDING KIDNEY, AND POSSIBILITY OF TUMOR MAY BE CONSIDERED. | TUMOR | NODULE | LEFT KIDNEY | 20 | — | LOW OPACITY | PRESENT | EQUAL OPACITY | PRESENT | — | — | ... |
| 4 | SLIGHTLY HIGH-OPACITY NODULE (21 × 20 mm) PROTRUDING OUTWARD FROM LEFT KIDNEY IS FOUND, WHICH IS SUSPICION TO BE HEMORRHAGIC CYST. | CYST | NODULE | LEFT KIDNEY | 21 | 20 | PROTRUSION | PRESENT | HIGH OPACITY | PRESENT | — | — | ... |
| ... | ... | ... | ... | ... | ... | ... | ... | ... | SLIGHTLY STRONG | ... | ... | ... | ... |

FIG. 7

| No. | DIAGNOSTIC INFORMATION d | FREQUENCY f(d) OF DIAGNOSTIC INFORMATION | FINDING INFORMATION t | FACTUALITY OF FINDING INFORMATION | FREQUENCY f(t, d) OF COMBINATION | IMPORTANCE |
|---|---|---|---|---|---|---|
| 1 | ANGIOMYOLIPOMA | 1000 | FAT DENSITY | PRESENT | 719 | 19.4 |
| | | | HIGH OPACITY | PRESENT | 71 | 8.5 |
| | | | LOW OPACITY | PRESENT | 50 | 3.9 |
| | | | MULTIPLE | PRESENT | 29 | 3.1 |
| | | | FAT DENSITY | ABSENT | 25 | 1.2 |
| | | | ⋮ | ⋮ | ⋮ | ⋮ |
| 2 | RENAL CELL CARCINOMA | 517 | INCREASE | PRESENT | 78 | 23.5 |
| | | | PROTRUSION | PRESENT | 55 | 22.1 |
| | | | CONTRAST EFFECT | PRESENT | 55 | 18.6 |
| | | | HETEROGENEOUS | PRESENT | 43 | 15.7 |
| | | | HYPERVASCULAR | PRESENT | 41 | 12.5 |
| | | | EARLY ENHANCEMENT | PRESENT | 39 | 8.9 |
| | | | FAT DENSITY | ABSENT | 102 | 5.5 |
| | | | CALCIFICATION | ABSENT | 98 | 4.5 |
| | | | ⋮ | ⋮ | ⋮ | ⋮ |
| ⋮ | ⋮ | ⋮ | ⋮ | ⋮ | ⋮ | ⋮ |
| 100 | ... | ... | ... | ... | ... | ... |

COMMENT ON FINDINGS SEARCH
SEARCH QUERY NARROWING DOWN [ANGIOMYOLIPOMA]

COMMENT-ON-FINDINGS CANDIDATES

■ ANGIOMYOLIPOMA

20 × 19 mm SIZED FAT DENSITY NODULE IS FOUND
IN LEFT KIDNEY. IT IS CONSIDERED TO BE AML.

THERE IS 20 × 19 mm SIZED NODULE ON OUTSIDE OF LEFT
KIDNEY.
INSIDE IS HETEROGENEOUS, BUT FAT DENSITY IS MAIN FACTOR.
IT IS CONSIDERED TO BE ANGIOMYOLIPOMA.

■ ANGIOMYOLIPOMA AND ONE OTHER DIAGNOSIS

THERE IS 20 × 19 mm SIZED NODULE SHOWING
EARLY ENHANCEMENT IN LEFT KIDNEY.
NO FAT DENSITY. RCC IS SUSPECTED, BUT ANGIOMYOLIPOMA
WITH SMALL AMOUNT OF FATTY COMPONENT
IS ALSO INCLUDED IN DIFFERENTIAL DIAGNOSIS.

■ ANGIOMYOLIPOMA AND TWO OTHER DIAGNOSES

THERE IS 20 × 19 mm SIZED LOW-OPACITY TUMOR
IN LEFT KIDNEY.
AML WITH SMALL AMOUNT OF FAT OR PAPILLARY RENAL
CARCINOMA IS INCLUDED IN DIFFERENTIAL DIAGNOSIS.

INFORMATION PROCESSING APPARATUS THAT SEARCHES FOR A PLURALITY OF COMMENT-ON-FINDINGS CANDIDATES RELATED TO A SEARCH QUERY

CROSS-REFERENCE TO RELATED APPLICATIONS

This application claims priority from Japanese Application No. 2023-187173, filed on Oct. 31, 2023, the entire disclosure of which is incorporated herein by reference.

BACKGROUND

Technical Field

The present disclosure relates to an information processing apparatus, an information processing method, and an information processing program.

Related Art

In the related art, image diagnosis is performed using medical images obtained by imaging apparatuses such as computed tomography (CT) apparatuses and magnetic resonance imaging (MRI) apparatuses. A creator of an interpretation report, such as a radiologist, interprets medical images and creates an interpretation report including a comment on findings.

As a method for supporting the creation of interpretation reports, a method that uses statistical information of previously created interpretation reports has been proposed. For example, JP2013-541786A discloses a system that suggests autocomplete terms at the time of inputting text for a report, providing terms that frequently co-occur with the term being input based on co-occurrence statistics between terms.

As a technology for supporting the creation of interpretation reports, a technology for presenting other information related to information that has already been input is desired. For example, in a case in which a wide variety of information could be presented as possible diagnoses from a certain finding, and other findings that are often listed alongside a certain finding, it is possible to easily search for previously created interpretation reports or to prevent information that should be described in the interpretation report from being omitted. On the other hand, as the variation of the information to be presented increases, it is difficult for users to quickly find desired information. Therefore, there is a need for a technology that allows users to quickly find desired information even in a case in which a wide variety of information is presented.

SUMMARY

The present disclosure provides an information processing apparatus, an information processing method, and an information processing program that can support creation of an interpretation report.

According to a first aspect of the present disclosure, there is provided an information processing apparatus comprising at least one processor, in which the processor is configured to: search for a plurality of comment-on-findings candidates related to a search query from a comment-on-findings group including a plurality of comments on findings; and present, based on a predetermined importance for each combination of two pieces of element information associated with each of the plurality of comment-on-findings candidates, at least one piece of the element information.

In the first aspect, the processor may be configured to present at least one of the comment-on-findings candidates associated with the combination having a relatively high importance.

In the first aspect, the processor may be configured to display a character string indicating the element information associated with the comment-on-findings candidate in a manner distinguishable from other character strings.

In the first aspect, the processor may be configured to present a diagram according to the importance of each combination.

In the first aspect, the combination may be a combination of first element information and second element information indicating information of different attributes.

In the first aspect, the first element information may indicate diagnostic information, and the second element information may indicate finding information.

In the first aspect, the processor may be configured to present a diagram showing a frequency of the first element information associated with the plurality of comment-on-findings candidates.

In the first aspect, the processor may be configured to present a diagram showing a frequency of the first element information included in the plurality of comment-on-findings candidates.

In the first aspect, the processor may be configured to: present a diagram showing a frequency of the first element information associated with the plurality of comment-on-findings candidates and then receive a selection of at least one piece of the first element information; and present a diagram according to the importance of each combination including the selected first element information.

In the first aspect, the processor may be configured to: present a diagram showing a frequency of the first element information included in the plurality of comment-on-findings candidates and then receive a selection of at least one piece of the first element information; and present a diagram according to the importance of each combination including the selected first element information.

In the first aspect, the processor may be configured to: receive a selection of at least one piece of the presented element information; narrow down the plurality of comment-on-findings candidates using the selected element information as an additional search query; and present at least one piece of the element information based on the importance of each combination of two pieces of the element information included in each of the plurality of comment-on-findings candidates after narrowing down.

In the first aspect, the importance may be a value corresponding to a frequency with which the combination is associated with the comment-on-findings group.

In the first aspect, the importance may be a value corresponding to a degree of uniqueness with which one of the element information included in the combination is not included in combinations with other pieces of element information other than the other element information.

In the first aspect, the importance may be a value corresponding to a frequency with which the combination is associated with the comment-on-findings group and a degree of uniqueness with which one of the element information included in the combination is not included in combinations with other pieces of element information other than the other element information.

In the first aspect, the processor may be configured to receive an input of the search query by a user.

In the first aspect, the processor may be configured to: acquire an image; and generate the element information as the search query based on the image.

In the first aspect, the element information may include at least one of a property, a position, a measurement value, and the number of a region of interest, a phrase expressing a change in the region of interest, or a type of element information other than the element information to be paired.

According to a second aspect of the present disclosure, there is provided an information processing method executed by a computer, the method comprising: searching for a plurality of comment-on-findings candidates related to a search query from a comment-on-findings group including a plurality of comments on findings; and presenting, based on a predetermined importance for each combination of two pieces of element information associated with each of the plurality of comment-on-findings candidates, at least one piece of the element information.

According to a third aspect of the present disclosure, there is provided an information processing program for causing a computer to execute a process comprising: searching for a plurality of comment-on-findings candidates related to a search query from a comment-on-findings group including a plurality of comments on findings; and presenting, based on a predetermined importance for each combination of two pieces of element information associated with each of the plurality of comment-on-findings candidates, at least one piece of the element information.

The information processing apparatus, the information processing method, and the information processing program according to the aspects of the present disclosure can support creation of an interpretation report.

BRIEF DESCRIPTION OF THE DRAWINGS

FIG. 6 is a diagram showing an example of information registered in a report DB.

FIG. 7 is a diagram showing an example of an importance table.

FIG. 10 is a diagram showing an example of a screen displayed on a display.

DETAILED DESCRIPTION

Hereinafter, embodiments of the present disclosure will be described with reference to the drawings.

Figure 1:
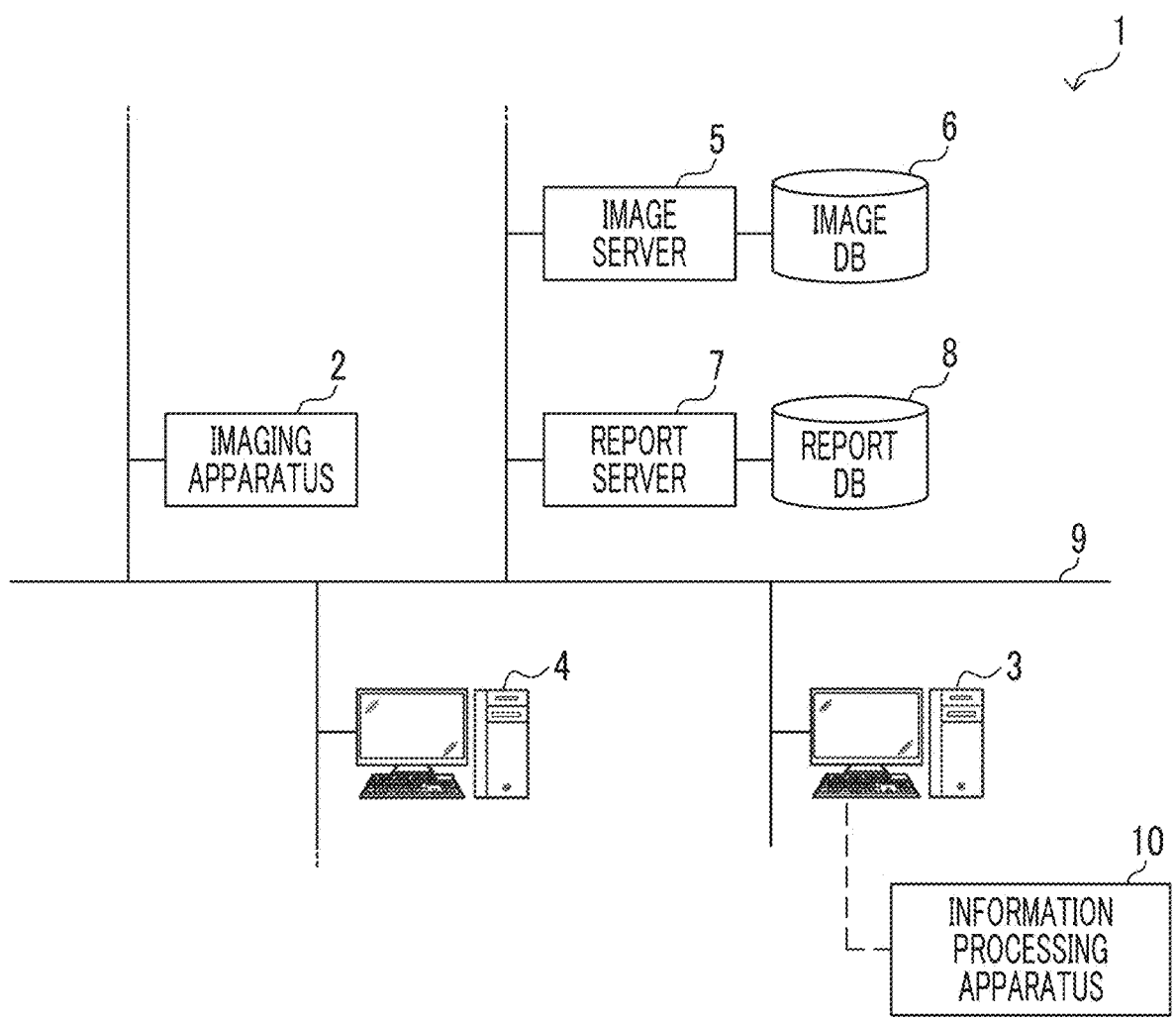
FIG. 1 is a diagram showing an example of a schematic configuration of an information processing system.

First, a configuration of an information processing system 1 to which an information processing apparatus 10 according to an aspect of the present disclosure is applied will be described with reference to FIG. 1. FIG. 1 is a diagram showing a schematic configuration of the information processing system 1. The information processing system 1 performs imaging of an examination target part of a subject and storing of the captured medical images based on an examination order from a doctor in a medical department using a known ordering system. In addition, the information processing system 1 allows a radiologist to interpret a medical image and create an interpretation report, and allows a doctor of a medical department that is a request source to view the interpretation report.

As shown in FIG. 1, the information processing system 1 includes an imaging apparatus 2, an interpretation worksta- tion (WS) 3 that is an interpretation terminal, a medical care WS 4, an image server 5, an image database (DB) 6, a report server 7, and a report DB 8. The imaging apparatus 2, the interpretation WS 3, the medical care WS 4, the image server 5, the image DB 6, the report server 7, and the report DB 8 are connected to each other via a wired or wireless network 9 in a communicable state.

Each apparatus is a computer on which an application program for causing each apparatus to function as a com- ponent of the information processing system 1 is installed. The application program may be recorded on, for example, a recording medium, such as a digital versatile disc read- only memory (DVD-ROM) or a compact disc read-only memory (CD-ROM), and distributed, and be installed on the computer from the recording medium. In addition, the application program may be stored in, for example, a storage device of a server computer connected to the network 9 or in a network storage in a state in which it can be accessed from the outside, and be downloaded and installed on the computer in response to a request.

The imaging apparatus 2 is an apparatus (modality) that generates a medical image T showing a diagnosis target part of the subject by imaging the diagnosis target part. Examples of the imaging apparatus 2 include a simple X-ray imaging apparatus, a computed tomography (CT) apparatus, a mag- netic resonance imaging (MRI) apparatus, a positron emis- sion tomography (PET) apparatus, an ultrasound diagnostic apparatus, an endoscope, a fundus camera, and the like. The medical image generated by the imaging apparatus 2 is transmitted to the image server 5 and is stored in the image DB 6.

Figure 2:
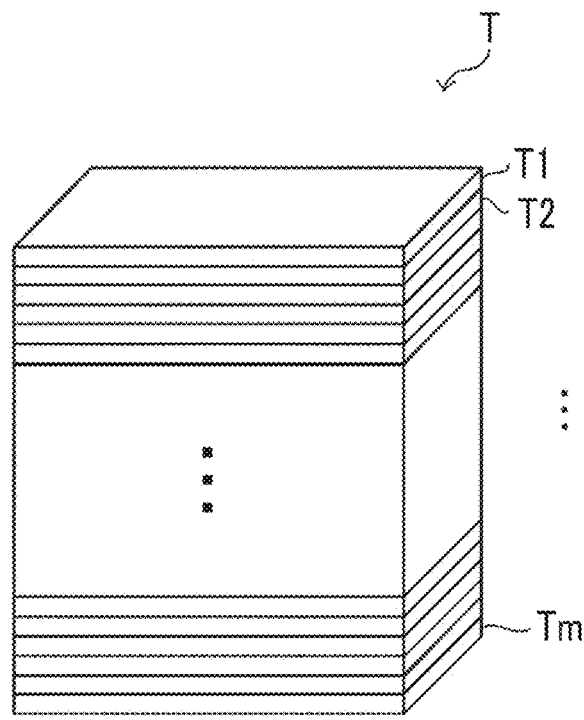
FIG. 2 is a diagram showing an example of a medical image.

FIG. 2 is a diagram schematically showing an example of a medical image acquired by the imaging apparatus 2. A medical image T shown in FIG. 2 is, for example, a CT image consisting of a plurality of tomographic images T1 to Tm (m is 2 or more) representing tomographic planes from a head to a waist of one subject (human body). The medical image T is an example of an image of the present disclosure.

Figure 3:
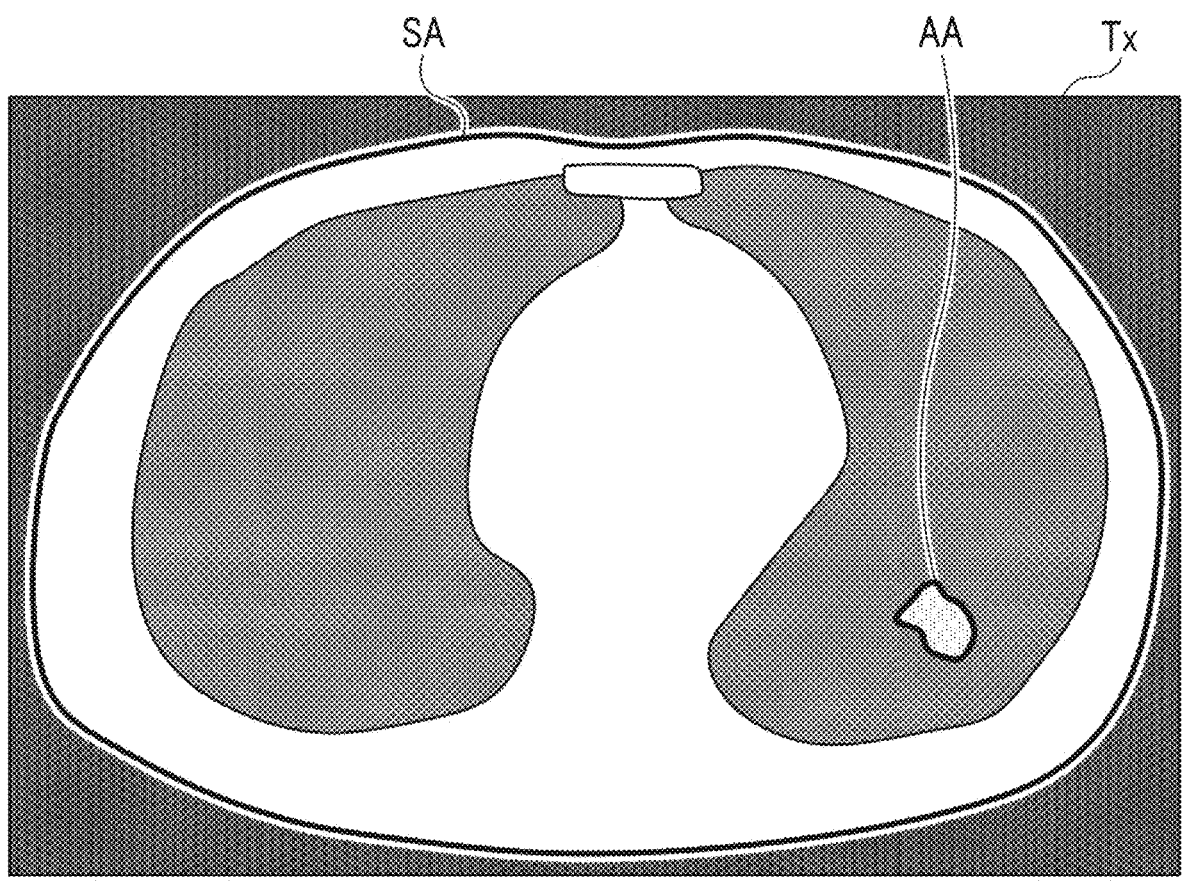
FIG. 3 is a diagram showing an example of a medical image.

FIG. 3 is a diagram schematically showing an example of one tomographic image Tx out of the plurality of tomo- graphic images T1 to Tm. The tomographic image Tx shown in FIG. 3 represents a tomographic plane including lungs. Each of the tomographic images T1 to Tm may include a region SA of a structure showing various organs and viscera of the human body (for example, lungs, kidneys, and the like), various tissues constituting various organs and viscera (for example, blood vessels, nerves, muscles, and the like), and the like. In addition, each tomographic image may include a lesion region AA such as, for example, nodules, tumors, injuries, defects, and inflammation. In the tomo- graphic image Tx shown in FIG. 3, a lung region is the region SA of the structure, and a nodule region is the lesion region AA. A single tomographic image may include regions SA of a plurality of structures and/or lesion regions AA.

Hereinafter, at least one of the region SA of the structure included in the medical image or the lesion region AA included in the medical image will be referred to as a "region of interest".

The interpretation WS 3 is a computer used by, for example, a healthcare professional such as a radiologist of a radiology department to interpret a medical image and to create an interpretation report, and encompasses the information processing apparatus 10 according to the present embodiment. In the interpretation WS 3, a viewing request for a medical image to the image server 5, various types of image processing for the medical image received from the image server 5, display of the medical image, and input reception of a sentence regarding the medical image are performed. In the interpretation WS 3, analysis processing for medical images, support for creating an interpretation report based on the analysis result, a registration request and a viewing request for the interpretation report to the report server 7, and display of the interpretation report received from the report server 7 are performed. The above processes are performed by the interpretation WS 3 executing software programs for respective processes.

The medical care WS 4 is a computer used by, for example, a healthcare professional such as a doctor in a medical department to observe a medical image in detail, view an interpretation report, create an electronic medical record, and the like, and is configured to include a processing device, a display device such as a display, and input devices such as a keyboard and a mouse. In the medical care WS 4, a viewing request for the medical image to the image server 5, display of the medical image received from the image server 5, a viewing request for the interpretation report to the report server 7, and display of the interpretation report received from the report server 7 are performed. The above processes are performed by the medical care WS 4 executing software programs for respective processes.

The image server 5 is a general-purpose computer on which a software program that provides a function of a database management system (DBMS) is installed. The image server 5 is connected to the image DB 6. The connection form between the image server 5 and the image DB 6 is not particularly limited, and may be a form connected by a data bus, or a form connected to each other via a network such as a network-attached storage (NAS) and a storage area network (SAN).

The image DB 6 is realized by, for example, a storage medium such as a hard disk drive (HDD), a solid-state drive (SSD), and a flash memory. In the image DB 6, the medical image acquired by the imaging apparatus 2 and accessory information attached to the medical image are registered in association with each other.

The accessory information may include, for example, identification information such as an image identification (ID) for identifying a medical image, a tomographic ID assigned to each tomographic image included in the medical image, a subject ID for identifying a subject, and an examination ID for identifying an examination. In addition, the accessory information may include, for example, information related to imaging such as an imaging method, an imaging condition, an imaging purpose, an imaging date and time, and an imaging location related to imaging of a medical image. The "imaging method" and "imaging condition" are, for example, a type of the imaging apparatus 2, an imaging part, an imaging protocol, an imaging sequence, an imaging method, the presence or absence of use of a contrast medium, a slice thickness in tomographic imaging, and the like. In addition, the accessory information may include information related to the subject such as the name, date of birth, age, and gender of the subject.

In a case in which the image server 5 receives a request to register a medical image from the imaging apparatus 2, the image server 5 prepares the medical image in a format for a database and registers the medical image in the image DB 6. In addition, in a case in which the viewing request from the interpretation WS 3 and the medical care WS 4 is received, the image server 5 searches for a medical image registered in the image DB 6 and transmits the found medical image to the interpretation WS 3 and to the medical care WS 4 that are viewing request sources.

The report server 7 is a general-purpose computer on which a software program that provides a function of a database management system is installed. The report server 7 is connected to the report DB 8. The connection form between the report server 7 and the report DB 8 is not particularly limited, and may be a form connected by a data bus or a form connected via a network such as a NAS and a SAN.

The report DB 8 is realized by, for example, a storage medium such as an HDD, an SSD, and a flash memory. In the report DB 8, an interpretation report created in the interpretation WS 3 is registered (details will be described later).

Further, in a case in which the report server 7 receives a request to register the interpretation report from the interpretation WS 3, the report server 7 prepares the interpretation report in a format for a database and registers the interpretation report in the report DB 8. Further, in a case in which the report server 7 receives the viewing request for the interpretation report from the interpretation WS 3 and the medical care WS 4, the report server 7 searches for the interpretation report registered in the report DB 8, and transmits the found interpretation report to the interpretation WS 3 and to the medical care WS 4 that are viewing request sources.

The network 9 is, for example, a network such as a local area network (LAN) and a wide area network (WAN). The imaging apparatus 2, the interpretation WS 3, the medical care WS 4, the image server 5, the image DB 6, the report server 7, and the report DB 8 included in the information processing system 1 may be disposed in the same medical institution, or may be disposed in different medical institutions or the like. Further, the number of each apparatus of the imaging apparatus 2, the interpretation WS 3, the medical care WS 4, the image server 5, the image DB 6, the report server 7, and the report DB 8 is not limited to the number shown in FIG. 1, and each apparatus may be composed of a plurality of apparatuses having the same functions.

Meanwhile, in a case in which the medical image is interpreted and the interpretation report is created in the interpretation WS 3, a past interpretation report (comment on findings) registered in the report DB 8 may be referred to for reference. In this case, a search query corresponding to the medical image to be interpreted is used to search for past comments on findings described in the same or similar findings and/or diagnoses as the medical image to be interpreted. For example, in a case in which a nodule of a kidney is included in a medical image to be interpreted, a search is performed using "kidney" and "nodule" as a search query, and comments on findings including "kidney" and "nodule" are presented as search results.

Furthermore, a user who has checked the search results may further narrow down the search results by inputting an additional search query. For example, as the additional search query, possible diagnoses based on the input search query (findings) and other findings that are often listed alongside the input search query (findings) are used. Therefore, in a case in which a wide variety of information can be presented as other information (additional search queries) related to information that has already been input (search query), it is possible to easily narrow down search results. In addition, by presenting a wide variety of information, it is possible to contribute to preventing information that should be described in the interpretation report from being omitted. On the other hand, as the variation of the information to be presented increases, it is difficult for users to quickly find desired information (additional search query).

Therefore, the information processing apparatus 10 according to the present embodiment supports the creation of interpretation reports by providing a function that allows the user to quickly find desired information while presenting a wide variety of information. The information processing apparatus 10 will be described below. As described above, the information processing apparatus 10 is encompassed in the interpretation WS 3.

Figure 4:
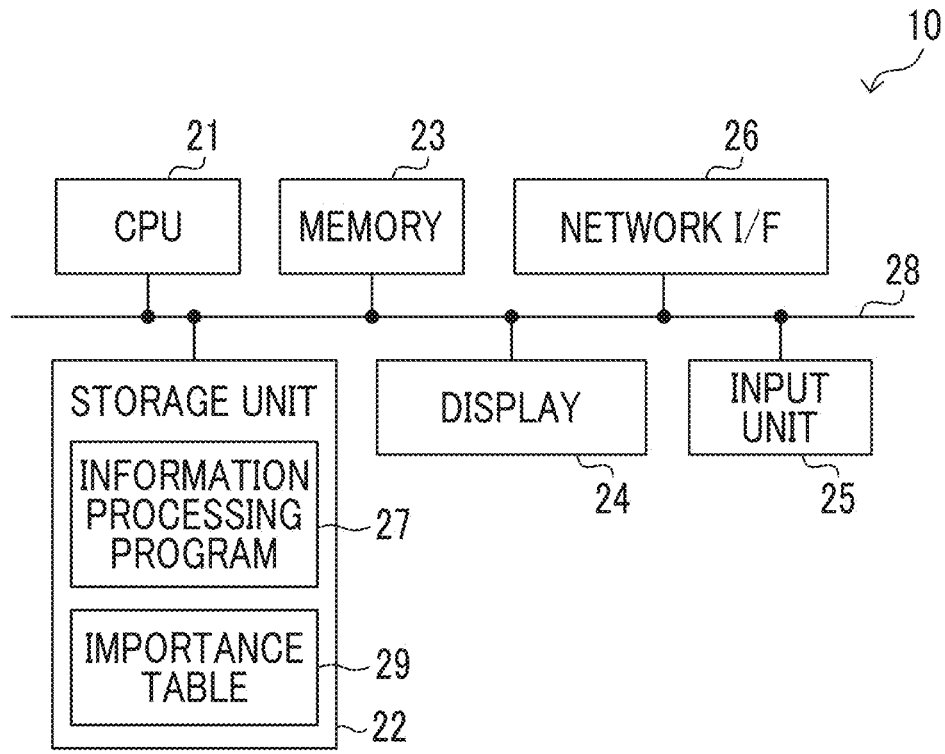
FIG. 4 is a block diagram showing an example of a hardware configuration of an information processing apparatus.

First, with reference to FIG. 4, an example of a hardware configuration of the information processing apparatus 10 according to the present embodiment will be described. As shown in FIG. 4, the information processing apparatus 10 includes a central processing unit (CPU) 21, a non-volatile storage unit 22, and a memory 23 as a temporary storage area. Further, the information processing apparatus 10 includes a display 24 such as a liquid-crystal display, an input unit 25 such as a keyboard and a mouse, and a network interface (I/F) 26. The network I/F 26 is connected to the network 9 and performs wired and/or wireless communication. The CPU 21, the storage unit 22, the memory 23, the display 24, the input unit 25, and the network I/F 26 are connected to each other via a bus 28 such as a system bus and a control bus so that various types of information can be exchanged.

The storage unit 22 is realized by, for example, a storage medium such as an HDD, an SSD, and a flash memory. An information processing program 27 in the information processing apparatus 10 is stored in the storage unit 22. The CPU 21 reads out the information processing program 27 from the storage unit 22, loads the read-out program into the memory 23, and executes the loaded information processing program 27. The CPU 21 is an example of a processor of the present disclosure. Also, the storage unit 22 stores an importance table 29 (details will be described later). As the information processing apparatus 10, for example, a personal computer, a server computer, a smartphone, a tablet terminal, a wearable terminal, or the like can be applied as appropriate.

Figure 5:
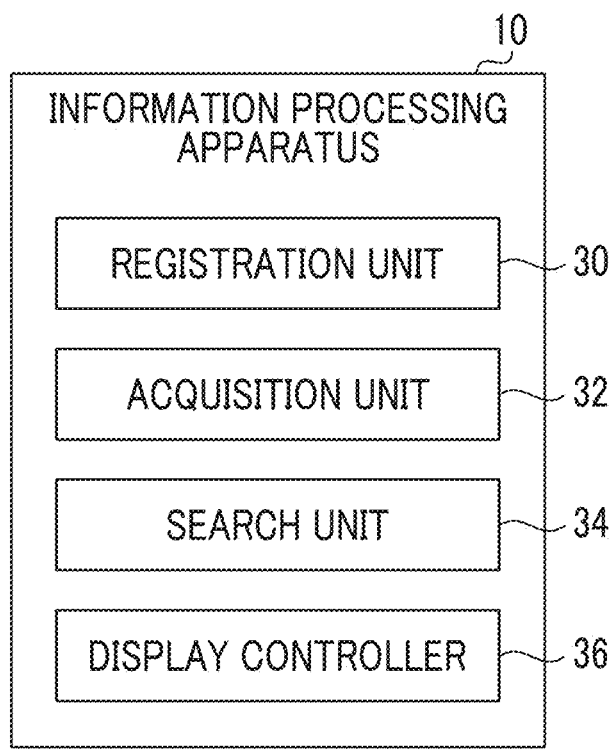
FIG. 5 is a block diagram showing an example of a functional configuration of the information processing apparatus.

Next, with reference to FIGS. 5 to 9, an example of a functional configuration of the information processing apparatus 10 according to the present embodiment will be described. As shown in FIG. 5, the information processing apparatus 10 includes a registration unit 30, an acquisition unit 32, a search unit 34, and a display controller 36. In a case in which the CPU 21 executes the information processing program 27, the CPU 21 functions as each of the functional units, namely, a registration unit 30, an acquisition unit 32, a search unit 34, and a display controller 36.

Structuring of Interpretation Report

First, a process of structuring an interpretation report will be described as pre-processing executed by the information processing apparatus 10 prior to the process of searching for a comment on findings. As described above, in the report DB 8, created interpretation reports are registered. FIG. 6 shows an example of information included in an interpretation report registered in the report DB 8. As shown in FIG. 6, a plurality of comments on findings and diagnostic information and finding information related to each of the comments on findings are registered in the report DB 8 in association with each other. The diagnostic information and the finding information are each an example of element information of the present disclosure.

The comments on findings are registered in the report DB 8 by the report server 7 at the time of creating each interpretation report. The registration unit 30 specifies, each of a plurality of comments on findings (hereinafter referred to as a comment-on-findings group) registered in the report DB 8, element information related to the comments on findings and adds the specified element information to the comments on findings (so-called structuring).

The diagnostic information is, for example, an estimated disease name diagnosed based on a medical image. The estimated disease name is an evaluation result estimated based on the lesion included in the medical image, and, for example, the disease name such as "cancer" and "inflammation" and the evaluation result such as "negative/positive", "benign/malignant", and "mild/severe" regarding disease names and properties can be mentioned. In FIG. 6, "angiomyolipoma", "renal cancer", "tumor", and "cyst" are illustrated as examples of diagnostic information.

In addition, one comment on findings may include a plurality of estimated disease names, such as "renal cell carcinoma is suspected, but angiomyolipoma with a small amount of fatty component may also be possible". In this case, the registration unit 30 may select one estimated disease name as diagnostic information, and add other estimated disease names that were not selected to the comment on findings as finding information.

The finding information is, for example, information indicating at least one of various findings such as a type (name), a property, a position, a measurement value, and the number of a region of interest, a phrase expressing a change in the region of interest, or a type of diagnostic information other than the diagnostic information to be paired. As described above, the type of diagnostic information other than the diagnostic information to be paired is an estimated disease name or the like that was not selected as diagnostic information.

Examples of the type (name) of the region of interest include the names of structures, such as "lung" and "liver", and the names of lesions, such as "nodule" and "ground glass opacity". The property of the region of interest mainly means the features of the lesion. For example, in the case of a nodule, findings indicating opacity such as "solid", "low opacity", and "high opacity", margin shapes such as "well-defined/ill-defined", "smooth/irregular", "spicula", "lobulated", and "lagged", and an overall shape such as "round" and "irregular form" can be mentioned. Also, for example, the relationship with the peripheral tissue, such as "protrusion", and findings regarding the presence or absence of contrast, washout, and the like can be mentioned.

The position of a region of interest means an anatomical position, a position in a medical image, and a relative positional relationship with other regions of interest such as "inside", "margin", and "surroundings". The anatomical position may be expressed by organ names such as "lung" and "kidney", or may be expressed by subdividing the kidney into "left kidney" and "superior segment".

The measurement value of a region of interest is a value that can be quantitatively measured from a medical image, and is, for example, at least one of a size or a signal value of a region of interest. The size is represented by, for example, a major axis, a minor axis, an area, a volume, or the like of a region of interest. The signal value is represented by, for example, a pixel value in a region of interest, a CT value in units of HU, or the like. In addition, the finding information indicating the measurement value may be divided into predetermined classes (that is, quantized), such as "0 mm or more and less than 5 mm", "5 mm or more and less than 10 mm", and "10 mm or more and less than 15 mm". In this case, for example, in a case in which the comment on findings includes the description "12 mm", the finding information "10 mm or more and less than 15 mm" is specified. Furthermore, the finding information indicating the measurement value may simply be information indicating whether or not it is described in the comment on findings. This is because measurement values may have a large variation or may not be described.

The number of regions of interest may be expressed as a specific numerical value such as one or two, or may be expressed in relative expressions such as "single/multiple" and "few/many". A phrase expressing a change in the region of interest is a phrase expressing changes over time in properties, positions, measurement values, numbers, and the like in a case in which follow-up observation for the region of interest is performed, and examples of such phrases include "appearance/disappearance", "increase/reduction", "worsening/improvement", and "metastasis".

Specifically, the registration unit 30 extracts named entities (words) from the comments on findings registered in the report DB 8, and specifies the element information corresponding to the extracted named entities. As a method for extracting named entities from a comment on findings, a known named entity extraction method using a natural language processing model such as, for example, bidirectional encoder representations from transformers (BERT) can be applied as appropriate.

In addition, the comment-on-findings group may include different words with the same meaning (synonyms), such as "angiomyolipoma" and "AML". In order to deal with such spelling variations due to synonyms, in a case in which a comment-on-findings group includes synonyms, it is preferable that the registration unit 30 adds the same element information to each of the comments on findings including synonyms (so-called normalization).

Specifically, a dictionary in which a correspondence relationship between named entities that may be included in a comment on findings and element information is defined, in which synonymous named entities are associated with the same element information, may be stored in advance in the storage unit 22. For example, in the dictionary, "angiomyolipoma" and "AML" indicating synonyms may each be associated with the same diagnostic information, "angiomyolipoma". The registration unit 30 may extract named entities from the comments on findings registered in the report DB 8 and specify the element information included in the comments on findings by referring to a dictionary.

In addition, it is preferable that the registration unit 30 also specifies the factuality of the specified element information. The "factuality" is information indicating whether the finding is found or not, and the degree of certainty thereof and the like. This is because interpretation reports may include not only findings that are clearly found from medical images, but also findings that are not found from medical images, and findings that are suspicious but have a low degree of certainty. For example, since the presence or absence and the degree of fatty components are used to differentiate between AML and renal cell carcinoma (RCC), the interpretation report may deliberately include that "no fatty components are observed".

In addition, the element information may be information that modifies other element information. In this case, it is preferable that the registration unit 30 also specifies a modification relationship between the pieces of element information. For example, "calcification", which is an example of the property of the lung nodule, may be described in detail as "microcalcification is observed in the center". In this case, the registration unit 30 may specify the finding information of "center" and "micro" as other finding information that modifies the finding information of "calcification". Examples of finding information that modifies "calcification" include "micro", "coarse", "scattered", "center", "ring-shaped", and "complete".

For example, in the case of "renal cell carcinoma", which is an example of diagnostic information based on the nodule of the kidney, a tissue type such as "clear cell type", "papillary", "chromophobe", and "multilocular cystic" may also be described in the comments on findings. The registration unit 30 may specify element information indicating the tissue type as described above as other element information that modifies the diagnostic information "renal cell carcinoma".

Furthermore, in a case in which one comment on findings includes element information related to a plurality of regions of interest (lesions), it is preferable that the registration unit 30 specifies element information about each region of interest.

In addition, in a case in which the diagnostic information cannot be specified from the comment on findings, the registration unit 30 may add the diagnostic information "undiagnosed" to the comment on findings. For example, in a case in which a lesion (region of interest) included in a medical image is small and the findings can be interpreted but are below diagnostic criteria predetermined in the guidelines (that is, are not important), only the finding information may be described and not described as diagnostic information. Also, for example, in a case in which the region of interest is clearly benign, only the finding information may be described and not described as diagnostic information. In addition, for example, diagnostic information may not be described due to an oversight by the creator who wrote the comment on findings. Furthermore, for example, there are cases where the registration unit 30 cannot specify diagnostic information from the comment on findings because the sentence structure of the comment on findings is complex.

Furthermore, the registration unit 30 may specify element information based on a medical image related to the comment on findings, such as a medical image registered in the image DB 6 or the like. Specifically, the registration unit 30 may specify element information that is not included in the comment on findings based on the medical image. In addition, the registration unit 30 does not need to specify all of the various types of element information described above, and may specify only a predetermined type of element information (for example, element information indicating the size of the region of interest) based on the medical image.

For example, in a case in which the size of the region of interest is small, it may be less important to describe it or it may not be possible to measure it from the medical image, but in a case in which the size of the region of interest is large, it can be seen from the medical image. Therefore, the description may be omitted from the comment on findings regardless of its size. On the other hand, the size of the region of interest may be related to properties, etc., and even in a case in which the description is omitted from the comment on findings, it may implicitly affect the content of the comment on findings. For example, in lung cancer, the larger the tumor, the more likely it is that internal necrosis will occur. Therefore, it is preferable that the registration unit 30 adds element information that is not included in the comment on findings but can be specified based on the medical image to the comment on findings and registers it in the report DB 8.

An example of a method for specifying element information based on a medical image will be described. The registration unit 30 acquires a medical image related to the comment on findings, and extracts at least one region of interest (for example, a nodule region) included in the medical image. As a method for extracting a region of interest, a method using known computer-aided detection/diagnosis (CAD) technology and artificial intelligence (AI) technology can be applied as appropriate. For example, the registration unit 30 may extract a region of interest from a medical image by using a learning model such as a convolutional neural network (CNN) that has been trained to receive the medical image as an input and extract and output a region of interest included in the medical image.

Then, the registration unit 30 generates element information of the extracted region of interest. For example, the registration unit 30 may generate element information of a region of interest by using a learning model such as a CNN that has been trained in advance to receive the region of interest extracted from the medical image as an input and output the element information of the region of interest. The registration unit 30 adds at least one of pieces of element information generated in this manner to the comment on findings and registers it in the report DB 8.

Furthermore, the registration unit 30 may generate element information based on accessory information attached to a medical image registered in, for example, the image DB 6 or the like. As described above, accessory information is attached to each medical image at the time of being registered in the image DB 6. In addition to this, for example, the registration unit 30 may acquire information included in an examination order and an electronic medical record, information indicating various test results such as a blood test and an infectious disease test, information indicating the result of a health diagnosis, and the like from the external device such as the medical care WS 4, and generate the acquired information as element information. For example, there may be cases in which the diagnosis estimated by a radiologist based on a medical image (that is, the diagnosis included in the comment on findings) differs from the diagnosis finalized by a doctor in the medical department taking into account the results of various other tests, and the like (that is, the definite diagnosis recorded in an electronic medical record or the like). In this case, at least one of element information indicating a diagnosis estimated from a medical image or element information indicating a definite diagnosis may be added to the comment on findings, or both may be added to the comment on findings.

Derivation of Importance

Next, a process of deriving importance using structured data registered in the report DB 8 will be described as pre-processing executed by the information processing apparatus 10 prior to the process of searching for comments on findings. By the above-described process of structuring the interpretation report, a plurality of comments on findings and element information related to each of the comments on findings are registered in the report DB 8 in association with each other.

Past interpretation reports (comments on findings) registered in the report DB 8 may include comments on findings with the same diagnosis but different findings, or comments on findings with the same findings but different diagnoses. For example, a typical example is that, in a case in which a nodule is seen in a medical image of the kidney, the nodule is diagnosed as AML in a case in which there is a fatty component, and the nodule is diagnosed as RCC in a case in which there is no fatty component, but in some cases, the nodule with a small amount of fatty component may be diagnosed as AML. In order to improve the quality of diagnoses in interpretation reports, it is desirable to present a wide variety of element information, rather than being limited to typical examples.

On the other hand, simply listing a wide variety of element information makes it difficult for a user to quickly find desired element information. Therefore, the registration unit 30 derives the importance for each combination of two pieces of element information as an index for presenting element information that is likely to be desired by the user.

FIG. 7 shows an example of the importance table 29 in which the importance is determined for each combination of diagnostic information and finding information. The importance table 29 also indicates the frequency of diagnostic information associated with the comment-on-findings group, and the frequency of combinations of diagnostic information and finding information associated with the comment-on-findings group. In addition, the combinations are divided according to the factuality of the finding information.

From the example of FIG. 7, it can be seen that the comment-on-findings group includes 1000 comments on findings associated with "angiomyolipoma" and 517 comments on findings associated with "renal cell carcinoma". It can also be seen that the comment-on-findings group includes 719 comments on findings associated with the combination of "angiomyolipoma" and "fat density" being "present". It can also be seen that the comment-on-findings group includes 25 comments on findings associated with the combination of "angiomyolipoma" and "fat density" being "absent". It can also be seen that the comment-on-findings group includes 102 comments on findings associated with the combination of "renal cell carcinoma" and "fat density" being "absent".

Specifically, the registration unit 30 may derive the importance based on a value corresponding to the frequency with which a combination of diagnostic information and finding information is associated with a comment-on-findings group. The more frequently a combination of diagnostic information and finding information is associated with a comment-on-findings group, the more typical the combination is, and it is considered that the more likely it is that the combination will be desired by a user who performs a search.

For example, the registration unit 30 may derive the importance for each combination of diagnostic information d and finding information t based on the following Equation (1). f(d) is the frequency of diagnostic information d associated with the comment-on-findings group, and f(t, d) is the frequency of the combination of diagnostic information d and finding information t associated with the comment-on-findings group. According to Equation (1), it can be said that the more frequently a piece of finding information t is described in a comment on findings in combination with certain diagnostic information d, the higher its importance.

$$tf(t, d) = \frac{f(t, d)}{f(d)} \quad (1)$$

Furthermore, the registration unit 30 may derive the importance based on a value corresponding to the degree of uniqueness with which finding information included in a combination of certain diagnostic information and finding information is not included in combinations with other diagnostic information. The degree of uniqueness indicates whether certain finding information is so rare that it is used in combination with only some diagnostic information, or whether it is so common that it is used in combination with many diagnostic information. The more unique the finding information, the more valuable it is as a basis for a diagnosis, and it is considered that the more likely it is that the finding information will be desired by the user who performs the search.

For example, the registration unit 30 may derive the importance for each combination of diagnostic information d and finding information t based on the following Equation (2). N is the number of types of all pieces of diagnostic information D associated with the comment-on-findings group, and $n_t$ is the number of types of diagnostic information that are associated with the comment-on-findings group in combination with finding information t among all pieces of diagnostic information D. According to Equation (2), the fewer the number of types of diagnostic information described in combination with certain finding information t (that is, the higher the degree of uniqueness), the higher the importance is derived.

$$idf(t, D) = \log\left(\frac{N}{1 + n_t}\right) + 1 \quad (2)$$

In addition, the registration unit 30 may derive the importance based on a value corresponding to the frequency with which a combination of diagnostic information and finding information is associated with a comment-on-findings group and the degree of uniqueness with which the finding information included in the combination is not included in combinations with other diagnostic information. For example, the registration unit 30 may derive the importance based on the following Equation (3) which combines the two indices expressed by Equations (1) and (2). According to Equation (3), in a case in which both the frequency and the degree of uniqueness are high, high importance is derived.

$$tfidf(t, d, D) = tf(t, d) \cdot idf(t, D) \quad (3)$$

In the importance table 29 of FIG. 7, the corresponding value of Equation (1) for the combination of "angiomyolipoma" and "fat density" being "present" is derived as 0.719, since f(t, d) is 719 and f(d) is 1000.

In addition, in the importance table 29 of FIG. 7, the number of types N of all diagnostic information D is 100, and there is only one type of diagnostic information, "angiomyolipoma", that can be combined with "fat density" being "present" (that is, $n_t$ is 1). In this case, the corresponding value of Equation (2) for the combination of "angiomyolipoma" and "fat density" being "present" is derived as log (100/(1+1))+1=2.70.

In the above case, the corresponding value of Equation (3) is derived as 0.719×2.70=1.94. In FIG. 7, as an example, a value obtained by multiplying the corresponding value in Equation (3) by 10 is shown as the importance.

The registration unit 30 may exclude, from the importance table 29, combinations of diagnostic information and finding information for which the derived importance is equal to or less than a predetermined threshold value, by regarding them as noise. Furthermore, the registration unit 30 may exclude, from the importance table 29, combinations of diagnostic information and finding information for which the derived importance is relatively low (for example, a predetermined number or percentage of combinations having a low importance), by regarding them as noise.

In the importance table 29 of FIG. 7, an example has been described in which an importance is predetermined for each combination of diagnostic information and finding information indicating information of different attributes, but the present disclosure is not limited thereto. For example, the importance may be predetermined for each combination of two pieces of element information indicating information of the same type of attribute (that is, a combination of two pieces of finding information, and a combination of two pieces of diagnostic information). In this case, the degree of uniqueness can be said to be a value corresponding to a degree to which one of the element information included in the combination is not included in combinations with other pieces of element information other than the other element information. The diagnostic information is an example of first element information of the present disclosure, and the finding information is an example of second element information of the present disclosure.

Search for Comments on Findings

Next, the process of searching for comments on findings executed by the information processing apparatus 10 will be described.

Figure 8:
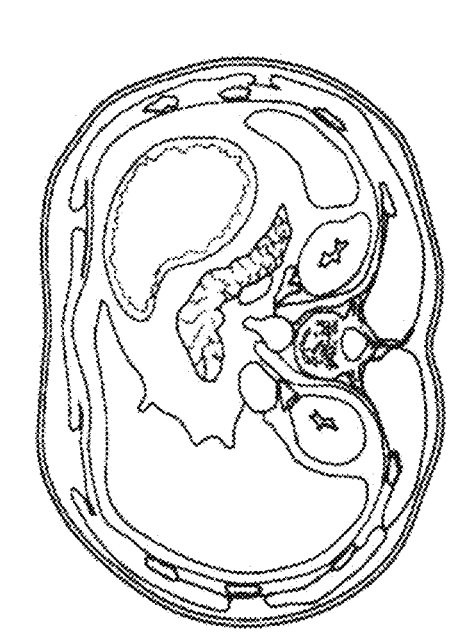
FIG. 8 is a diagram showing an example of a screen displayed on a display.

The acquisition unit 32 acquires a search query. For example, the acquisition unit 32 may receive a search query input by the user via the input unit 25. FIG. 8 shows an example of a screen D0 for inputting a search query, which is displayed on the display 24 by the display controller 36. On the screen D0, a medical image T0 to be interpreted, a text box 90 for each item for inputting a search query, and a slider bar 92 for designating the major axis and the minor axis of the region of interest are displayed. A user checks the medical image T0 and inputs at least one search query. In the example shown in FIG. 8, "kidney", "left kidney", "nodule", and "18×25 mm" are input as the search query.

For example, the acquisition unit 32 may acquire a medical image T0 to be interpreted from the image server 5, and generate element information about the medical image T0 as a search query based on the medical image T0. In addition, a search query input by a user and a search query generated based on a medical image may be used in combination.

An example of a method for generating element information (search query) based on a medical image is described. For example, the acquisition unit 32 extracts at least one region of interest (for example, a nodule region) included in the acquired medical image T0. As a method for extracting the region of interest, a known method using a CAD technology, an AI technology, or the like can be appropriately applied. For example, the acquisition unit 32 may extract a region of interest from a medical image by using a learning model such as a CNN that has been trained to receive the medical image as an input and extract and output a region of interest included in the medical image.

The acquisition unit 32 generates element information of the extracted region of interest. For example, the acquisition unit 32 may generate element information of a region of interest by using a learning model such as a CNN that has been trained in advance to receive the region of interest extracted from the medical image as an input and output the element information of the region of interest. The acquisition unit 32 may use at least one of pieces of element information generated in this manner as a search query. In addition, the acquisition unit 32 does not need to specify all of the various types of element information (for example, an organ, an area name, findings, a change over time, and a diagnosis), and may specify only a predetermined type of element information (for example, element information indicating the size of the region of interest) based on the medical image and use the specified element information as a search query.

The search unit 34 searches for a plurality of comment-on-findings candidates related to the search query acquired by the acquisition unit 32 from a comment-on-findings group including a plurality of comments on findings registered in the report DB 8. The search unit 34 may perform a search by giving a priority to a predetermined type of search query. For example, the search unit 34 may perform a search by giving a priority to search queries indicating organs, types, properties, and diagnoses of lesions. On the other hand, the search unit 34 does not need to use a search query indicating the position and measurement values of a lesion for the search. This is because positions and measurement values vary widely from subject to subject, and therefore using them in a search would result in fewer search results. On the other hand, in a case of reusing comment-on-findings candidates, the time and effort required for correcting them is minimal, and therefore it may be more efficient not to use them in a search.

Furthermore, in a case of searching for a comment-on-findings candidate, the search unit 34 may allow ambiguity in the search query used for the search. For example, for a search query indicating a position, comment-on-findings candidates to which finding information indicating a position within a predetermined range (for example, the position of an anatomically adjacent area) is added may be output as search results. Also, for example, for a search query indicating a measurement value, a comment-on-findings candidate to which finding information indicating a measurement value including a difference in a predetermined amount or percentage has been added may be output as a search result. For example, for a search query indicating a diagnosis, comment-on-findings candidates to which diagnostic information indicating different diagnoses belonging to the same classification (for example, "primary lung cancer" and "lung cancer") is added may be output as search results. In addition, the determination as to whether or not different diagnoses belong to the same classification may be made using, for example, International Statistical Classification of Diseases and Related Health Problems (ICD) codes, dictionaries, ontologies, and the like.

Figure 9:
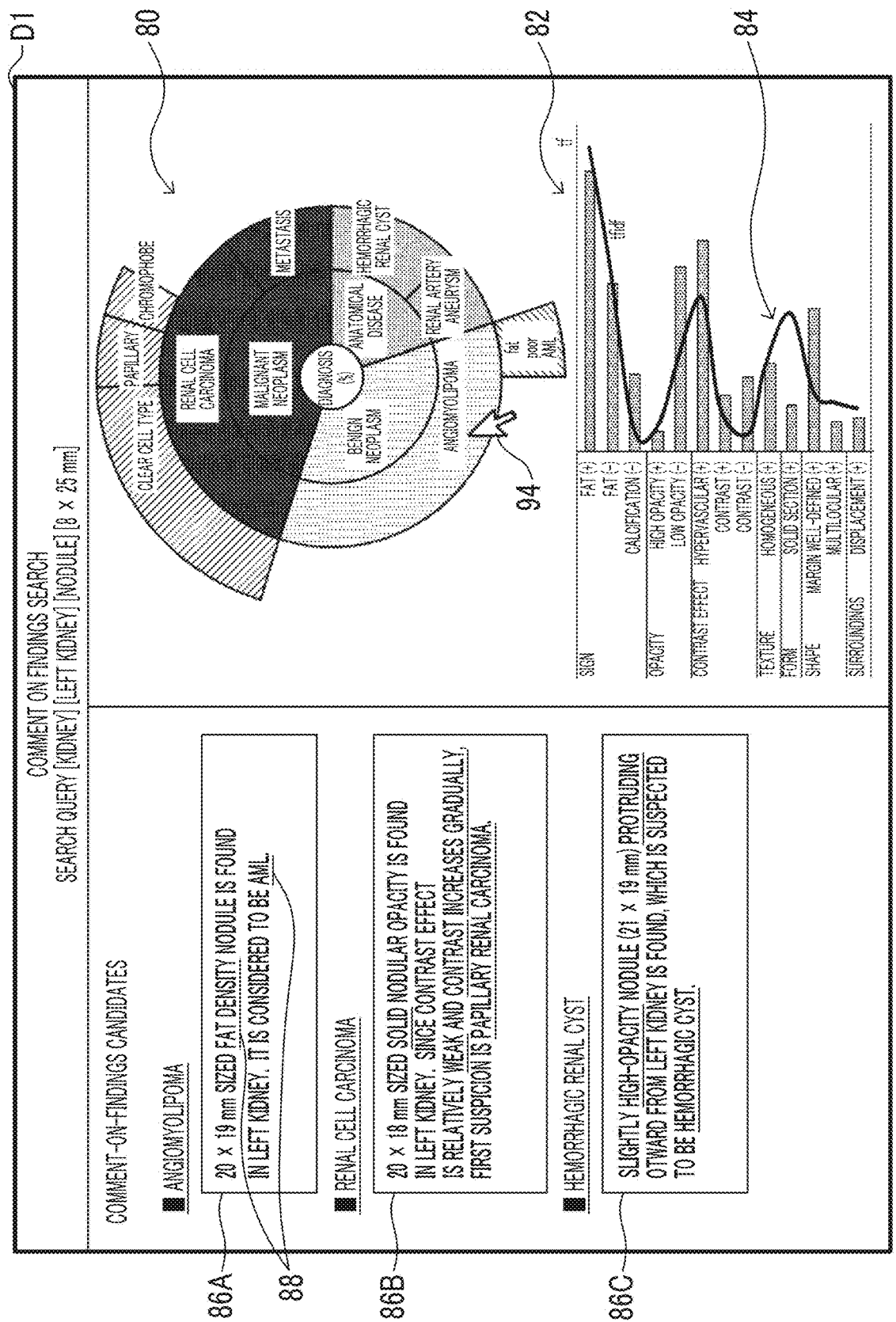
FIG. 9 is a diagram showing an example of a screen displayed on a display.

The display controller 36 presents at least one piece of element information based on a predetermined importance for each combination of two pieces of element information associated with each of the plurality of comment-on-findings candidates searched for by the search unit 34. FIG. 9 shows an example of a screen D1 showing search results displayed on the display 24 by the display controller 36 in a case in which "kidney", "left kidney", "nodule", and "18×25 mm" are used as search queries.

Specifically, the display controller 36 may present at least one comment-on-findings candidate associated with a combination of two pieces of element information having a relatively high importance. For example, the display controller 36 may specify two pieces of element information associated with the comment-on-findings candidates searched for by the search unit 34, and acquire the importance of the combination of the two pieces of specified element information by referring to the importance table 29. Then, the display controller 36 may present comment-on-findings candidates associated with combinations having a relatively high importance (for example, a predetermined number or percentage of combinations having a high importance).

For example, a comment-on-findings candidate 86A in FIG. 9 includes a combination of "angiomyolipoma (AML)" and "fat density" being "present". In this case, the display controller 36 acquires the importance "19.4" corresponding to the combination of "angiomyolipoma" and "fat density" being "present" from the importance table 29. The display controller 36 performs such processing on all the comment-on-findings candidates searched for by the search unit 34, and determines the comment-on-findings candidates to be presented based on the importance. The comment-on-findings candidates presented in this manner are associated with element information having a relatively high importance, which increases the likelihood that the comment-on-findings candidates will include information desired by the user, thereby contributing to the user quickly finding the desired information.

In addition, the display controller 36 may divide the plurality of comment-on-findings candidates searched for the search unit 34 into a plurality of groups based on the type of diagnostic information associated with the comment-on-findings candidate and may determine at least one comment-on-findings candidate to be presented for each group. In FIG. 9, one of comment-on-findings candidates 86A to 86C is presented for each of the three groups of "angiomyolipoma", "renal cell carcinoma", and "hemorrhagic renal cyst". According to such a form, it is possible to increase the variation of the comment-on-findings candidates to be presented.

In addition, in a case in which a plurality of combinations of two pieces of element information are associated with a comment-on-findings candidate, the display controller 36 may determine the comment-on-findings candidate to be presented using a representative value such as a total value, an average value, a weighted average value, and a multiplication value of the importance of each combination.

In addition, the display controller 36 may display a character string indicating the element information associated with the comment-on-findings candidate 86 in a manner distinguishable from other character strings. In FIG. 9, in each of the comment-on-findings candidates 86A to 86C, the character string indicating the element information is displayed in a distinguishable manner by attaching an underline 88. For example, in the comment-on-findings candidate 86A, the underlines 88 are attached to the character strings of "fat density" and "AML". Methods for displaying character strings in a distinguishable manner include, for example, changing the thickness, size, italics, font, character color, and background color of the characters, attaching underlining, strikethrough, and enclosing lines, and displaying the character strings in different fields. According to such a form, it is easy to visually understand which element information is associated with the comment-on-findings candidate. Therefore, the user can quickly find desired information.

Furthermore, the display controller 36 may present a diagram according to the importance of each combination of two pieces of element information associated with each of a plurality of comment-on-findings candidates. Such diagrams are visual displays of information and include, for example, various graphs (charts) and tables. FIG. 9 shows, as an example of such a diagram, a horizontal bar graph 82 indicating the frequency of each piece of finding information (see tf in Equation (1) above) and a curve graph 84 indicating a value corresponding to the frequency and degree of uniqueness of each piece of finding information (see tfidf in Equation (3) above). In FIG. 9, (+) means that the finding is factual (the finding can be interpreted from the medical image), and (−) means that the finding is not factual (the finding cannot be interpreted from the medical image).

For example, the horizontal bar graph 82 indicates a representative value such as the total value of the frequency (see tf in the above Equation (1)) for each piece of finding information. That is, the horizontal bar graph 82 makes it possible to know frequently occurring finding information associated with a comment-on-findings candidate, regardless of the diagnostic information. For example, in FIG. 7, the frequency of finding information with "fat density" set to "absent" is 0.025 (25/1000) in the combination with angiomyolipoma, and 0.197 (102/517) in the combination with renal cell carcinoma. In this case, the value of the "fat (−)" item in the horizontal bar graph 82 is 0.222 (the sum of 0.025 and 0.197).

On the other hand, the curve graph 84 indicates representative values such as the average value of the values (see tfidf in the above Equation (3)) corresponding to the frequency and degree of uniqueness for each piece of finding information. That is, the curve graph 84 reflects the degree of uniqueness that may serve as the basis for a diagnosis. For example, in FIG. 7, the importance of finding information with "fat density" set to "absent" is 1.2 in the combination with angiomyolipoma, and 5.5 in the combination with renal cell carcinoma. In this case, the value of the "fat (−)" item in the curve graph 84 is 3.35 (the average of 1.2 and 5.5).

The display controller 36 may determine the finding information (items) to be displayed on the graph in descending order of frequency or importance in at least one of the horizontal bar graph 82 or the curve graph 84. Furthermore, the display controller 36 may display the finding information (items) to be displayed on the graph in at least one of the horizontal bar graph 82 or the curve graph 84 in a categorized and organized manner as shown in FIG. 9.

Furthermore, the display controller 36 may present a diagram showing the frequency associated with a plurality of comment-on-findings candidates with respect to the diagnostic information. FIG. 9 shows a hierarchical structure graph 80 (a so-called sunburst graph) as an example of such a diagram. The hierarchical structure graph 80 counts diagnostic information added to each of a plurality of comment-on-findings candidates as search results based on the search query ("kidney", "left kidney", "nodule", and "18×25 mm"), and shows their frequency as a percentage.

The hierarchical structure graph 80 also represents the hierarchical relationship of the diagnostic information from higher classifications (inside the pie chart) to lower classifications (outside the pie chart). According to the hierarchical structure graph 80, for example, it becomes easy to visually understand the percentage of "angiomyolipoma" among the comment-on-findings candidates as the search result, and further, the percentage of "angiomyolipoma with a small amount of fatty component (fat poor AML)" among those. Therefore, the user can quickly find desired information.

In addition, the hierarchical relationship of the diagnosis classification may be determined using, for example, International Statistical Classification of Diseases and Related Health Problems (ICD) codes, dictionaries, ontologies, and the like. For example, based on overlap of terms in the dictionary and the ontology, a higher classification of ["renal (kidney)" cell "carcinoma (cancer)"] may be specified as ["renal (kidney)" "carcinoma (cancer)"]. In addition, the higher classification of [clear cell type "renal (kidney)" "cell" "carcinoma (cancer)"] may be specified as ["renal (kidney)" "cell" "carcinoma (cancer)"].

As described above, there may be cases in which the diagnosis estimated by a radiologist based on a medical image (that is, the estimated diagnosis included in the comment on findings) differs from the diagnosis finalized by a doctor in the medical department taking into account the results of various other tests, and the like (that is, the definite diagnosis recorded in an electronic medical record or the like). In this case, the diagnostic information used in the diagram presented by the display controller 36 may indicate at least one of an estimated diagnosis or a definite diagnosis. Specifically, the display controller 36 may present a diagram that combines an estimated diagnosis and a definite diagnosis, may present two diagrams that separate the estimated diagnosis and the definite diagnosis, or may present a single diagram that shows only either the estimated diagnosis or the definite diagnosis. For example, the frequency may be basically counted using a definite diagnosis, and the frequency may be counted using an estimated diagnosis only for comment-on-findings candidates to which no definite diagnosis has been added. Also, for example, different weights may be assigned to the definite diagnosis and the estimated diagnosis, and the frequency may be counted using both. Also, for example, only the comment-on-findings candidates for which the estimated diagnosis and the definite diagnosis match may be counted in frequency. The information indicating a definite diagnosis and the information indicating an estimated diagnosis are examples of first element information associated with a plurality of comment-on-findings candidates of the present disclosure. The information indicating an estimated diagnosis is an example of first element information included in a plurality of comment-on-findings candidates of the present disclosure.

Furthermore, the display controller 36 may receive an additional search query for further narrowing down the comment-on-findings candidates as the search results, and update the content of the screen D1 based on the received search query. FIG. 10 shows an example of a screen D2 that is updated in a case in which "angiomyolipoma" is designated as an additional search query on the screen D1, which is displayed on the display 24 by the display controller 36. As shown in a hierarchical structure graph 80 of FIG. 10, the display controller 36 may change the color of the portion corresponding to the received search query ("angiomyolipoma") to make it easier to understand.

Specifically, the display controller 36 may receive the selection of at least one piece of the element information presented on the screen D1. In this case, in order to make it easier for the user to narrow down the search results, it is preferable to present a diagram (for example, a hierarchical structure graph 80) showing the frequency with which diagnostic information is associated with or included in a plurality of comment-on-findings candidates, and then receive the selection of at least one piece of diagnostic information. For example, on the screen D1, the user uses a pointer 94 to select the diagnostic information of "angiomyolipoma" described in the hierarchical structure graph 80. Note that the selectable portions on the screen D1 are not limited to items in the hierarchical structure graph 80, and the item names of comment-on-findings candidates may be selected or the item names of the horizontal bar graph 82 and the curve graph 84 may be selected.

The search unit 34 narrows down a plurality of comment-on-findings candidates using the selected element information as an additional search query. For example, in a case in which "angiomyolipoma" is selected as an additional search query, the search unit 34 outputs only the comment-on-findings candidates associated with "angiomyolipoma" as search results.

The display controller 36 presents at least one piece of element information based on the importance of each combination of two pieces of element information associated with each of the plurality of comment-on-findings candidates after narrowing down by the search unit 34. For example, the display controller 36 presents at least one comment-on-findings candidate associated with the selected element information. Furthermore, for example, the display controller 36 presents a diagram (hierarchical structure graph 80) according to the importance of each combination including the selected diagnostic information. Furthermore, for example, the display controller 36 presents a diagram (horizontal bar graph 82 and curve graph 84) according to the importance of each combination.

According to such a form, since element information related to the "angiomyolipoma" selected by the user is presented, it is possible to consider the basis for the diagnosis, and it is possible to increase the certainty of the diagnosis or to cast suspicions on it.

Note that the display controller 36 may further receive a selection of additional element information on the screen D2 after narrowing down. In this case, based on the selected element information, the comment-on-findings candidates are similarly narrowed down and the screen is updated.

Furthermore, the display controller 36 may receive a cancellation of element information that has been received once on the screen D2 after narrowing down. In this case, the narrowing down of the comment-on-findings candidates is cancelled, and the screen returns to the state of screen D1.

Note that the above hierarchical structure graph 80, horizontal bar graph 82, and curve graph 84 are examples of diagrams of the present disclosure, and similar information may be presented using other forms of charts and graphs. Further, for example, the diagram is not limited to a graph, and the number of cases, percentage, numerical value, and the like may be displayed in a tabular format.

Figure 11:
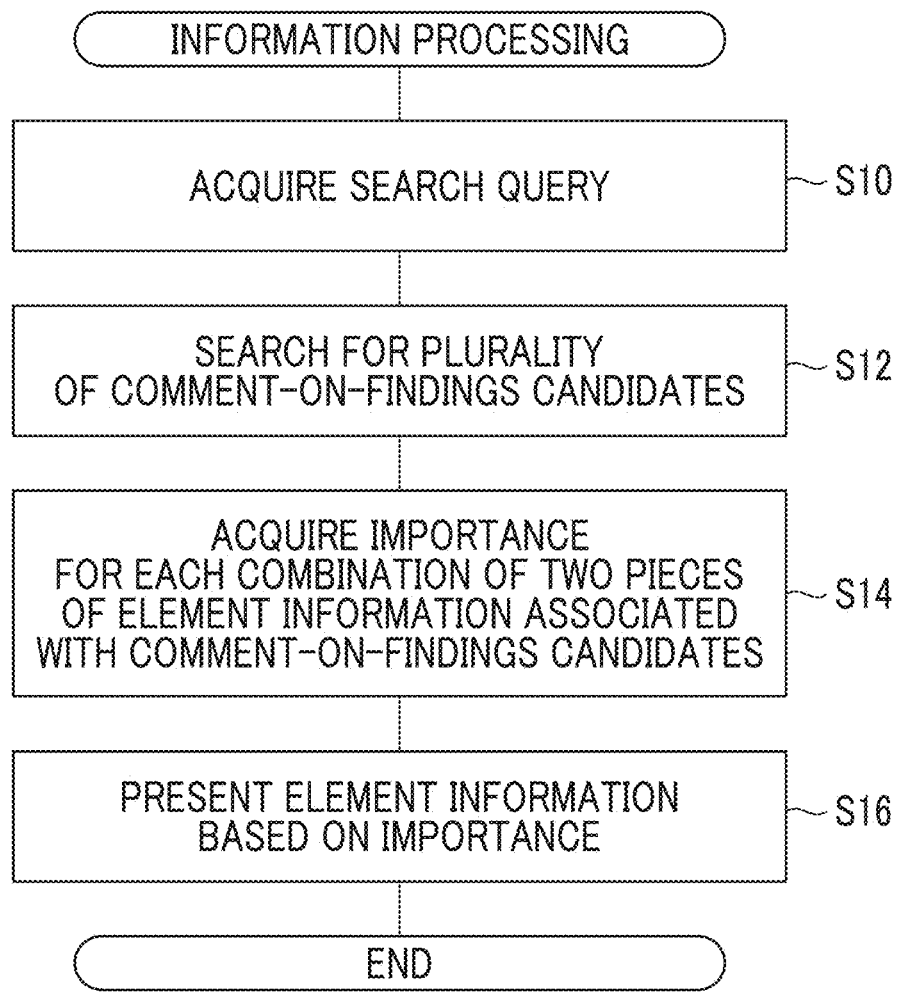
FIG. 11 is a flowchart showing an example of information processing.

Next, with reference to FIG. 11, operations of the information processing apparatus 10 according to the embodiment will be described. In the information processing apparatus 10, as the CPU 21 executes the information processing program 27, information processing shown in FIG. 11 is executed. The information processing is executed, for example, in a case in which the user gives an instruction to start execution via the input unit 25. It is assumed that the process of structuring the interpretation report and the process of deriving the importance described above have been executed in advance.

In Step S10, the acquisition unit 32 acquires a search query. In Step S12, the search unit 34 searches for a plurality of comment-on-findings candidates related to the search query acquired in Step S10 from a comment-on-findings group including a plurality of comments on findings registered in the report DB 8.

In Step S14, the display controller 36 acquires a predetermined importance (for example, an importance registered in the importance table 29) for each combination of two pieces of element information associated with the comment-on-findings candidates. In Step S16, the display controller 36 performs control to display a screen for presenting the element information on the display 24 based on the importance acquired in Step S14, and then ends the present information processing.

As described above, the information processing apparatus 10 according to one aspect of the present disclosure comprises at least one processor, in which the processor is configured to: searches for a plurality of comment-on-findings candidates related to a search query from a comment-on-findings group including a plurality of comments on findings; and present, based on a predetermined importance for each combination of two pieces of element information associated with each of the plurality of comment-on-findings candidates, at least one piece of the element information.

That is, the information processing apparatus 10 according to the present embodiment can present element information having a relatively high importance with respect to the search query. The "element information having a relatively high importance" means that the element information is highly likely to be desired by the user. Therefore, the user can quickly find desired information while presenting a wide variety of information, thereby supporting the creation of interpretation reports.

Note that, in above embodiment, a form assuming interpretation for medical images has been described, but the present disclosure is not limited thereto. The information processing apparatus 10 according to the embodiment of the present disclosure can be applied to various images including a region of interest, which are obtained by imaging a subject. For example, the information processing apparatus 10 may be applied to an image acquired using an apparatus, a building, a pipe, a welded portion, or the like as a subject in a non-destructive examination such as a radiation transmission examination and an ultrasonic flaw detection examination. In this case, for example, the region of interest indicates cracks, flaws, bubbles, foreign matter, or the like.

In addition, in the above embodiment, for example, as hardware structures of processing units that execute various kinds of processing, such as the registration unit 30, the acquisition unit 32, the search unit 34, and the display controller 36, various processors shown below can be used. As described above, the various processors include a programmable logic device (PLD) as a processor of which the circuit configuration can be changed after manufacture, such as a field-programmable gate array (FPGA), a dedicated electrical circuit as a processor having a dedicated circuit configuration for executing specific processing such as an application-specific integrated circuit (ASIC), and the like, in addition to the CPU as a general-purpose processor that functions as various processing units by executing software (programs).

One processing unit may be configured by one of the various processors, or may be configured by a combination of the same or different kinds of two or more processors (for example, a combination of a plurality of FPGAs or a combination of the CPU and the FPGA). In addition, a plurality of processing units may be configured by one processor.

As an example in which a plurality of processing units are configured by one processor, first, there is a form in which one processor is configured by a combination of one or more CPUs and software as typified by a computer, such as a client or a server, and this processor functions as a plurality of processing units. Second, as represented by a system-on-chip (SoC) or the like, there is a form of using a processor for realizing the function of the entire system including a plurality of processing units with one integrated circuit (IC) chip. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

In the above embodiments, the various programs are described as being stored (installed) in the storage unit in advance; however, the present disclosure is not limited thereto. The various programs may be provided in a form recorded in a recording medium such as a compact disc read-only memory (CD-ROM), a digital versatile disc read-only memory (DVD-ROM), and a Universal Serial Bus (USB) memory. In addition, the various programs may be configured to be downloaded from an external device via a network. Furthermore, the technology of the present disclosure extends to a storage medium that non-transitorily stores a program, in addition to the program.

The technology of the present disclosure can be appropriately combined with the above embodiment and examples. The described contents and illustrated contents shown above are detailed descriptions of the parts related to the technology of the present disclosure, and are merely an example of the technology of the present disclosure. For example, the above description of the configuration, function, operation, and effect is an example of the configuration, function, operation, and effect of the parts related to the technology of the present disclosure. Therefore, it goes without saying that unnecessary parts may be deleted, new elements may be added, or replacements may be made to the described contents and illustrated contents shown above within a range that does not deviate from the gist of the technology of the present disclosure.

Regarding the embodiments, the following supplementary notes are further disclosed.

Supplementary Note 1

An information processing apparatus comprising at least one processor,
in which the processor is configured to:
search for a plurality of comment-on-findings candidates related to a search query from a comment-on-findings group including a plurality of comments on findings; and
present, based on a predetermined importance for each combination of two pieces of element information associated with each of the plurality of comment-on-findings candidates, at least one piece of the element information.

Supplementary Note 2

The information processing apparatus according to Supplementary Note 1,
in which the processor is configured to present at least one of the comment-on-findings candidates associated with the combination having a relatively high importance.

Supplementary Note 3

The information processing apparatus according to Supplementary Note 2,
in which the processor is configured to display a character string indicating the element information associated with the comment-on-findings candidate in a manner distinguishable from other character strings.

Supplementary Note 4

The information processing apparatus according to any one of Supplementary Notes 1 to 3,
in which the processor is configured to present a diagram according to the importance of each combination.

Supplementary Note 5

The information processing apparatus according to any one of Supplementary Notes 1 to 4,
in which the combination is a combination of first element information and second element information indicating information of different attributes.

Supplementary Note 6

The information processing apparatus according to Supplementary Note 5,
in which the first element information indicates diagnostic information, and
the second element information indicates finding information.

Supplementary Note 7

The information processing apparatus according to Supplementary Note 5 or 6,
in which the processor is configured to present a diagram showing a frequency of the first element information associated with the plurality of comment-on-findings candidates.

Supplementary Note 8

The information processing apparatus according to Supplementary Note 7,
in which the processor is configured to present a diagram showing a frequency of the first element information included in the plurality of comment-on-findings candidates.

Supplementary Note 9

The information processing apparatus according to Supplementary Note 5,
in which the processor is configured to:
present a diagram showing a frequency of the first element information associated with the plurality of comment-on-findings candidates and then receive a selection of at least one piece of the first element information; and
present a diagram according to the importance of each combination including the selected first element information.

Supplementary Note 10

The information processing apparatus according to Supplementary Note 9,
in which the processor is configured to:
present a diagram showing a frequency of the first element information included in the plurality of comment-on-findings candidates and then receive a selection of at least one piece of the first element information; and present a diagram according to the importance of each combination including the selected first element information.

Supplementary Note 11

The information processing apparatus according to any one of Supplementary Notes 1 to 10,
in which processor is configured to:
receive a selection of at least one piece of the presented element information;
narrow down the plurality of comment-on-findings candidates using the selected element information as an additional search query; and
present at least one piece of the element information based on the importance of each combination of two pieces of the element information included in each of the plurality of comment-on-findings candidates after narrowing down.

Supplementary Note 12

The information processing apparatus according to any one of Supplementary Notes 1 to 11,
in which the importance is a value corresponding to a frequency with which the combination is associated with the comment-on-findings group.

Supplementary Note 13

The information processing apparatus according to any one of Supplementary Notes 1 to 12,
in which the importance is a value corresponding to a degree of uniqueness with which one of the element information included in the combination is not included in combinations with other pieces of element information other than the other element information.

Supplementary Note 14

The information processing apparatus according to any one of Supplementary Notes 1 to 13,
in which the importance is a value corresponding to a frequency with which the combination is associated with the comment-on-findings group and a degree of uniqueness with which one of the element information included in the combination is not included in combinations with other pieces of element information other than the other element information.

Supplementary Note 15

The information processing apparatus according to any one of Supplementary Notes 1 to 14,
in which the processor is configured to receive an input of the search query by a user.

Supplementary Note 16

The information processing apparatus according to any one of Supplementary Notes 1 to 15,
in which the processor is configured to:
acquire an image; and
generate the element information as the search query based on the image.

Supplementary Note 17

The information processing apparatus according to any one of Supplementary Notes 1 to 15,
in which the element information includes at least one of a property, a position, a measurement value, and the number of a region of interest, a phrase expressing a change in the region of interest, or a type of element information other than the element information to be paired.

Supplementary Note 18

An information processing method executed by a computer, the method comprising:
searching for a plurality of comment-on-findings candidates related to a search query from a comment-on-findings group including a plurality of comments on findings; and
presenting, based on a predetermined importance for each combination of two pieces of element information associated with each of the plurality of comment-on-findings candidates, at least one piece of the element information.

Supplementary Note 19

An information processing program for causing a computer to execute a process comprising:
searching for a plurality of comment-on-findings candidates related to a search query from a comment-on-findings group including a plurality of comments on findings; and
presenting, based on a predetermined importance for each combination of two pieces of element information associated with each of the plurality of comment-on-findings candidates, at least one piece of the element information.

What is claimed is:
1. An information processing apparatus comprising a processor, a display, and an input device, wherein the processor is configured to:
search for a plurality of comment-on-findings candidates related to a search query from a comment-on-findings group including a plurality of comments on findings, the plurality of comment-on-findings candidates being related to a predetermined medical image and the search query being either input by a user via the input device or based on information extracted from the predetermined medical image; and
determine, based on a predetermined value of importance for each combination of two pieces of element information associated with each of the plurality of comment-on-findings candidates, at least one comment-on-findings candidate to be presented, and at least one piece of the element information to be presented;
present, on the display, the at least one comment-on-findings candidate to be presented and the at least one piece of the element information to be presented.
2. The information processing apparatus according to claim 1, wherein the processor is configured to present at least one of the comment-on-findings candidates associated with the combination having a relatively high importance.

3. The information processing apparatus according to claim 2, wherein the processor is configured to display a character string indicating the element information associated with the comment-on-findings candidate in a manner distinguishable from other character strings.

4. The information processing apparatus according to claim 1, wherein the processor is configured to present a diagram according to the importance of each combination.

5. The information processing apparatus according to claim 1, wherein the combination is a combination of first element information and second element information indicating information of different attributes.

6. The information processing apparatus according to claim 5, wherein:
the first element information indicates diagnostic information, and
the second element information indicates finding information.

7. The information processing apparatus according to claim 5, wherein the processor is configured to present a diagram showing a frequency of the first element information associated with the plurality of comment-on-findings candidates.

8. The information processing apparatus according to claim 7, wherein the processor is configured to present a diagram showing a frequency of the first element information included in the plurality of comment-on-findings candidates.

9. The information processing apparatus according to claim 5, wherein the processor is configured to:
present a diagram showing a frequency of the first element information associated with the plurality of comment-on-findings candidates and then receive a selection of at least one piece of the first element information; and
present a diagram according to the importance of each combination including the selected first element information.

10. The information processing apparatus according to claim 9, wherein the processor is configured to:
present a diagram showing a frequency of the first element information included in the plurality of comment-on-findings candidates and then receive a selection of at least one piece of the first element information; and
present a diagram according to the importance of each combination including the selected first element information.

11. The information processing apparatus according to claim 1, wherein processor is configured to:
receive a selection of at least one piece of the presented element information;
narrow down the plurality of comment-on-findings candidates using the selected element information as an additional search query; and
present at least one piece of the element information based on the importance of each combination of two pieces of the element information associated with each of the plurality of comment-on-findings candidates after narrowing down.

12. The information processing apparatus according to claim 1, wherein the importance is a value corresponding to a frequency with which the combination is associated with the comment-on-findings group.

13. The information processing apparatus according to claim 1, wherein the importance is a value corresponding to a degree of uniqueness with which one of the element information included in the combination is not included in combinations with other pieces of element information other than the other element information.

14. The information processing apparatus according to claim 1, wherein the importance is a value corresponding to:
a frequency with which the combination is associated with the comment-on-findings group; and
a degree of uniqueness with which one of the element information included in the combination is not included in combinations with other pieces of element information other than the other element information.

15. The information processing apparatus according to claim 1, wherein the processor is configured to receive an input of the search query by a user.

16. The information processing apparatus according to claim 1, wherein the processor is configured to:
acquire an image; and
generate the element information as the search query based on the image.

17. The information processing apparatus according to claim 1, wherein the element information includes at least one of a property, a position, a measurement value, and the number of a region of interest, a phrase expressing a change in the region of interest, or a type of element information other than the element information to be paired.

18. An information processing method executed by a computer, the method comprising:
searching for a plurality of comment-on-findings candidates related to a search query from a comment-on-findings group including a plurality of comments on findings, the plurality of comment-on-findings candidates being related to a predetermined medical image and the search query being either input by a user via an input device or based on information extracted from the predetermined medical image;
determining, based on a predetermined value of importance for each combination of two pieces of element information associated with each of the plurality of comment-on-findings candidates, at least one comment-on-findings candidate to be presented, and at least one piece of the element information to be presented; and
presenting, on a display, the at least one comment-on-findings candidate to be presented and the at least one piece of the element information to be presented.

19. A non-transitory computer-readable storage medium storing an information processing program for causing a computer to execute a process comprising:
searching for a plurality of comment-on-findings candidates related to a search query from a comment-on-findings group including a plurality of comments on findings, the plurality of comment-on-findings candidates being related to a predetermined medical image and the search query being either input by a user via an input device or based on information extracted from the predetermined medical image;
determining, based on a predetermined value of importance for each combination of two pieces of element information associated with each of the plurality of comment-on-findings candidates, at least one comment-on-findings candidate to be presented, and at least one piece of the element information to be presented; and
presenting, on a display, the at least one comment-on-findings candidate to be presented and the at least one piece of the element information to be presented.

* * * * *